US012148059B2

(12) United States Patent
Shao et al.

(10) Patent No.: US 12,148,059 B2
(45) Date of Patent: Nov. 19, 2024

(54) METHODS AND SYSTEMS FOR CIVIL ADMINISTRATION IN SMART CITY BASED ON INTERNET OF THINGS (IoT)

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 246 days.

(21) Appl. No.: 17/664,214

(22) Filed: May 19, 2022

(65) Prior Publication Data

US 2022/0277409 A1    Sep. 1, 2022

(51) Int. Cl.
*G06Q 10/00* (2023.01)
*G06Q 10/0637* (2023.01)
*G06Q 50/26* (2012.01)

(52) U.S. Cl.
CPC ....... *G06Q 50/26* (2013.01); *G06Q 10/06375* (2013.01)

(58) Field of Classification Search
None
See application file for complete search history.

(56) References Cited

U.S. PATENT DOCUMENTS

| 2007/0208677 | A1* | 9/2007 | Goldberg | G06N 3/126 706/13 |
| 2008/0091510 | A1* | 4/2008 | Crandall | G06Q 30/0205 705/7.33 |
| 2008/0215415 | A1* | 9/2008 | Willms | G06Q 30/02 705/14.43 |
| 2010/0293123 | A1* | 11/2010 | Barrett | G06Q 30/00 706/13 |
| 2012/0042253 | A1* | 2/2012 | Priyadarshan | G06Q 30/02 715/733 |
| 2012/0116837 | A1* | 5/2012 | Dunlop | G06Q 10/0635 705/7.28 |

(Continued)

OTHER PUBLICATIONS

YS Kim, WN Street, GJ Russell (Customer targeting: A neural network approach guided by genetic algorithms), Management . . . , 2005—pubsonline.informs.org). (Year: 2005).*

(Continued)

*Primary Examiner* — Hafiz A Kassim
(74) *Attorney, Agent, or Firm* — METIS IP LLC

(57) ABSTRACT

The embodiments of the specification provide a method for civil administration in a smart city based on the Internet of Things (IoT). The method may include: a civil administration platform obtaining target resident information of a target area from a civil service platform, wherein the target resident information may be obtained by the civil service platform after processing resident information of a target user in response to a civil service request sent by the target user through a user platform; and determining, based on the target resident information, an increased population of the target area within a target period.

4 Claims, 6 Drawing Sheets

(56) References Cited

U.S. PATENT DOCUMENTS

| | | | |
|---|---|---|---|
| 2012/0209658 A1* | 8/2012 | Shibayama | G06Q 10/10 |
| | | | 705/7.29 |
| 2017/0329875 A1* | 11/2017 | Detwiler | G06Q 10/06 |
| 2018/0342030 A1* | 11/2018 | Magleby | G06F 17/10 |
| 2021/0173855 A1* | 6/2021 | Liu | H04W 4/021 |
| 2021/0182444 A1* | 6/2021 | Tomarkin | G06F 30/10 |

OTHER PUBLICATIONS

White Paper on Urban Brain Development, Smart City Standard Working Group of National Beacon Commission, 2022, 59 pages.

Shao, Zehua, Exploration and Research on the Structure of Internet of Things, Internet of Things Technologies Reliable Transmission, 2015, 10 pages.

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

* cited by examiner

300

Obtaining target resident information in a target area from the civil service platform; the target resident information may be obtained after processing corresponding resident information of the target user by a civil service platform in response to a civil service request sent by a target user through a user platform ~310

Determining the increased population of the target area within the target period based on the target resident information ~320

```
┌─────────────────────────────────────────────┐
│ Obtaining a variety of candidate solutions used for │  ~610
│ encouraging fertility when increased population is smaller │
│ than a preset population threshold │
└─────────────────────────────────────────────┘
                      │
                      ▼
┌─────────────────────────────────────────────┐
│ Scoring a variety of candidate solutions │  ~620
└─────────────────────────────────────────────┘
                      │
                      ▼
┌─────────────────────────────────────────────┐
│ Determining the target solution of the target area within │  ~630
│ target period based on the scores of a variety of candidate │
│ solutions │
└─────────────────────────────────────────────┘
```

FIG. 6

METHODS AND SYSTEMS FOR CIVIL ADMINISTRATION IN SMART CITY BASED ON INTERNET OF THINGS (IoT)

TECHNICAL FIELD

The present disclosure relates to the field of Internet of Things (IoT) and cloud platforms, and in particular, to a method and system for civil administration in a smart city based on the IoT.

BACKGROUND

Population prediction provides important information for socio-economic development planning, e.g., indicating the possible problems in economic development, thereby helping formulate correct policy. An increased population prediction refers to predicting the increased population within a certain period in the future according to the current population status and considering the various factors affecting the development of the population by scientific methods. Through civil services of scientific and reasonable increased population prediction, the population and age structure in the future may be learnt, which contributes to the distribution and balance of the future labor force, and helps to distribute social resources with maximum efficiency. In this way, more reasonable plans on social welfare, cultural and educational health, urban development, and construction may be made, and a virtuous circle of society may be achieved.

Therefore, a method and system for civil administration in a smart city based on the IoT is needed to obtain target resident information of the target area, thereby determining the increased population within the target period.

SUMMARY

One of the embodiments of the present disclosure provides a method for civil administration in a smart city based on the IoT, which may be applied in a civil administration platform, including: obtaining target resident information of a target area from a civil service platform, wherein the target resident information may be obtained by the civil service platform after processing resident information of a target user in response to a civil service request sent by the target resident through a user platform; and determining an increased population of the target area within a target period based on the target resident information.

One of the embodiments of the present disclosure provides a system for civil administration in a smart city based on the IoT, which includes a user platform, a civil service platform and a civil administration platform. The civil administration platform may be configured to perform the following operations: obtaining the target resident information of the target area from the civil service platform, wherein the target resident information may be obtained by the civil service platform after processing resident information of a target user in response to a civil service request sent by the target resident through a user platform; and determining an increased population of the target area within a target period based on the target resident information.

One of the embodiments of the present disclosure provides an Internet of Things-based wisdom city civil administration system. The system includes a user platform, a civil service platform, and a civil administration platform, of which: The user platform is used to obtain a civil service request sent by the user and send the civil service request to the civil service platform. The civil service platform is used to handle the resident information corresponding to the target user according to the received civil service request, and determine the target resident information of the target area and send it to the civil administration platform. The civil administration platform is used to determine the increased population of the target area based on the target resident information.

One of the embodiments of the present disclosure provides a computer readable storage medium, the storage medium storages computer instructions, when the computer reads the computer instructions in the storage medium, the computer performs the method for civil administration in a smart city based on the IoT provided by the embodiments of the present disclosure.

BRIEF DESCRIPTION OF THE DRAWINGS

The present disclosure will be further described in the way of exemplary embodiments, which will be described in detail by the drawings. These embodiments are not limited, in these embodiments, the same number denote the same structure, wherein:

FIG. 3 is an exemplary flowchart illustrating the method for civil administration in a smart city based on the IoT according to some embodiments of the present disclosure;

FIG. 6 is an exemplary flowchart illustrating a process for determination of a target solution according to some embodiments of the present disclosure.

DETAILED DESCRIPTION

Figure 1:
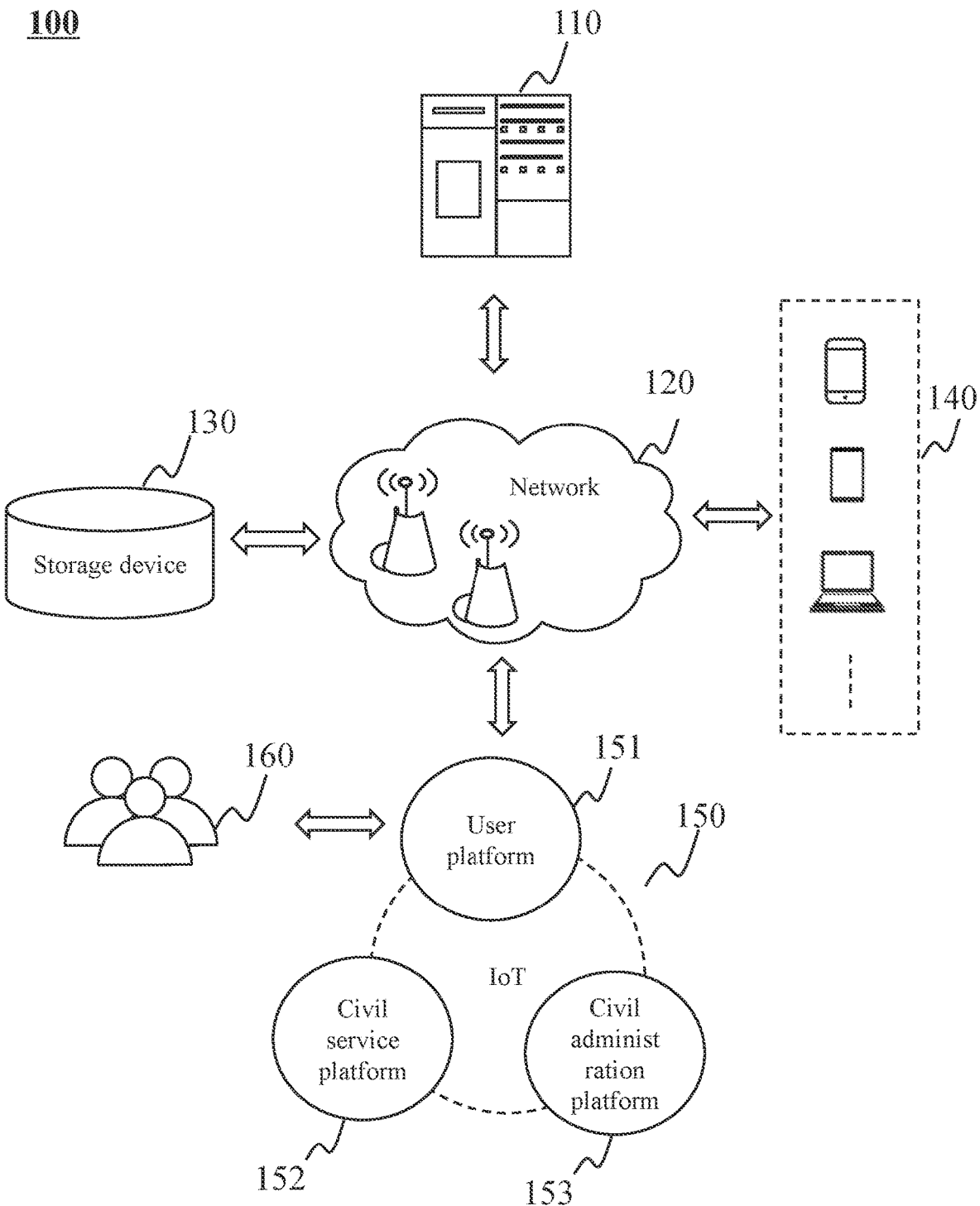
FIG. 1 is a schematic diagram of the application scenario of the system for civil administration in a smart city according to some embodiments of the present disclosure.

The technical solution of the present disclosure embodiment is more clearly described below, and the accompanying drawings need to be used in the description of the embodiments will be briefly described below. It will be apparent that the drawings in the following description are merely some examples or embodiments of the present disclosure, and those of ordinary skill in the art will apply the specification to these drawings in other similar scenarios without the premise of creative labor. Unless obviously obtained from the context or the context illustrates otherwise, the same numeral in the drawings refers to the same structure or operation.

It should be understood that "systems", "devices", "unit", and/or "modules" used herein are a method for distinguishing different components, elements, components, partial or assemblies of different levels. However, if other words may be achieved, the words may be replaced by other expressions.

As shown in the present disclosure and the claims, unless the context clearly dictates otherwise, the words "a", "an", and/or "the" are not intended to be specific in the singular and may include the plural. Generally speaking, the terms "comprise", "include," "including", and/or "comprising"

only imply that the clearly identified steps and elements are included, which do not constitute an exclusive list, and the method or apparatus may also include other steps or elements.

The flowchart is used in this disclosure to illustrate the operations performed by the system in accordance with embodiments of the present disclosure. It should be understood that the front or rear operation is not necessarily performed in order. Instead, each step may be processed in reverse or simultaneously. At the same time, other operations may further be added to these processes or to remove one or more steps from these processes.

FIG. 1 is a schematic diagram of the application scenario of the system for civil administration in a smart city according to some embodiments of the present disclosure.

As shown in FIG. 1, the application scenario 100 of a system for civil administration in a smart city (also referred to as civil administration system in a smart city) may include a processing device 110, a network 120, a storage device 130, a terminal 140, an Internet of Things system 150, and a target user 160.

The processing device 110 may process information and/or data related to application scenario 100 to perform one or more functions described in the present disclosure. For example, the processing device 110 may determine the increased populations within the target period based on target resident information. In some embodiments, the processing device 110 may include one or more processing engines (e.g., a single-chip processing engine or a multi-chip processing engine). Just as an example, the processing device 110 may include a central processing unit (CPU). The processing device 110 may process data, information, and/or processing results obtained from other devices or system components, and execute program instructions based on the data, information, and/or processing results to perform one or more functions described in the present disclosure.

The network 120 may include any suitable network that provides information and/or data exchange capable of promoting the application scenario 100 of a system for civil administration in a smart city. Information and/or data may be exchanged through the network 120 between one or more components of the application scenario 100 (e.g., storage device 130, processing device 110, terminal 140). For example, network 120 may obtain the target resident information from the civil service platform and send it to a civil administration platform. In some embodiments, the network 120 may be any one or more of wired networks or wireless networks. In some embodiments, the network 120 may include one or more network access points. For example, the network 120 may include wired or wireless network access points. In some embodiments, the network may be a point-to-point, shared, centralized, etc., or of various topologies or a combination of multiple topologies.

The storage device 130 may be configured to store data, instructions, and/or any other information. In some embodiments, storage device 130 may store data and/or information obtained from the processing device 110, the terminal 140, or the like. For example, the storage device 130 may store target resident information, historical data, etc. of a target area. In some embodiments, the storage device 130 may be disposed in the processing device 110. In some embodiments, the storage device 130 may include a large capacity memory, a removable memory, etc., or any combination thereof.

The terminal 140 may refer to a device or other entities used by the related people. In some embodiments, the terminal 140 may be the terminal used by the manager of the civil service platform 152, for example, the terminal used by the staff of a civil service platform 152. In some embodiments, the terminal 140 may be the terminal used by the user of a user platform 151. For example, the target user 160 may send a civil service request through the user platform 151. In some embodiments, the terminal 140 may include mobile devices, tablet computers, laptops, or any combination thereof. The terminal 140 may interact with other components of the application scenario 100 through network 120. For example, the mobile device may receive a civil service request sent by the target user 160 through the user platform 151. In some embodiments, the terminal 140 may include other smart terminals, such as wearable smart terminals, or the like. The terminal 140 may be a smart terminal or an entity including a smart terminal. For example, a management device including a smart computer, or the like.

The IoT system 150 may refer to an information processing system. In some embodiments, the IoT platform may be a method for civil administration in a smart city provided by the present disclosure. For example, the target user may submit a civil service request and receive the processing results of the request by accessing the IoT system 150. For another example, the IoT system may store resident information and predict the increased population of the target area within the target period according to the target resident information.

In some embodiments, when the IoT 150 is applied to city management, it may be called as an IoT system in a smart city. In some embodiments, the IoT system in a smart city may include a system for civil administration in a smart city. For example, when the IoT system 150 is applied to civil service, it may include parts or all of the platform 151, the civil service platform 152, and the civil administration platform 153. The user platform 151 may interact with the target user 160 to obtain the civil service request of the target user 160. The civil service platform 152 may manage and store data in the IoT System 150. For example, the civil service platform 152 may analyze the civil service request and update the resident information based on the analyzing result. The civil administration platform 153 may realize the overall planning and coordination of the connection and cooperation between various functional platforms. The civil administration platform 153 may perform the civil administration methods shown in the embodiments of the present disclosure. More about the IoT System 150, the user platform 151, the civil service platform 152, and the civil administration platform 153 may be referred to in FIG. 2 and related descriptions, which will not be repeated here.

The target user 160 may refer to people in the target area. For example, the target user 160 may include residents in the target area. The target user 160 may send a civil service request to the IoT system 150 and obtain the processing results of the civil service request. For example, the target user 160 may send a newborn registration request to the user platform 151, the request may be processed by the civil service platform 152, and the target user 160 may receive newborn's household registration information and the household registration file after change.

It should be noted that the application scenario 100 of the system for civil administration in a smart city is merely provided for the purposes of illustration, and not intended to limit the scope of the present disclosure. For persons having ordinary skills in the art, multiple variations and modifications may be made under the teachings of the present disclosure. For example, the application scenario 100 of the system for civil administration in a smart city may achieve similar or different functions on other devices. However, those variations and modifications do not depart from the scope of the present disclosure.

Figure 2:
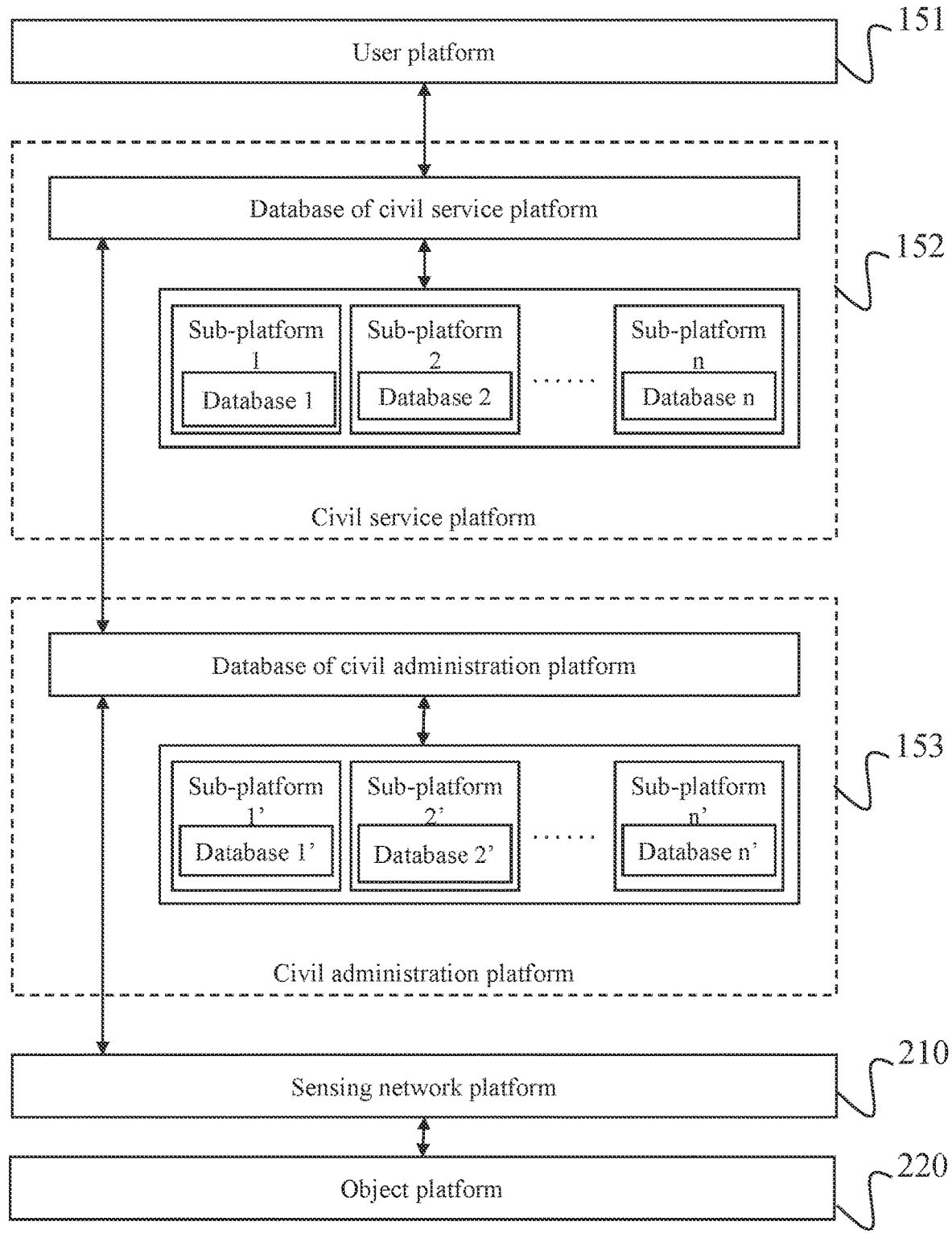
FIG. 2 is a schematic diagram of the system for civil administration in a smart city according to some embodiments of the present disclosure.

FIG. 2 is a schematic diagram of the system for civil administration in a smart city according to some embodiments of the present disclosure. As shown in FIG. 2, a civil administration system 200 in a smart city may be implemented based on an IoT system 150. The civil administration system 200 in a smart city may include a user platform 151, a civil service platform 152, a civil administration platform 153, a sensing network platform 210, and an object platform 220. In some embodiments, the civil administration system 200 in a smart city may be part of the processing device 110 or may be implemented by the processing device 110.

The user platform 151 may refer to a user-oriented service interface. The user may send a civil service request (also referred to as user needs information) through the user platform 151 to the civil administration system 200 in a smart city. The user may refer to the direct or indirect service objects of the civil administration system 200 in a smart city. For example, the user may include natural persons, corporate legal persons, non-corporate legal persons, civil affairs staffs, etc.

In some embodiments, the civil service requests the user proposes may be related to preset functions of the civil administration system 200 in a smart city. For example, the preset functions of the civil administration system 200 in a smart city include a lease contract registration, and the residents may apply for filing and registration of the housing lease contract through the user platform 151. For another example, the preset functions of the civil administration system 200 in a smart city include changes of resident population, and the civil affairs staffs may record or update the resident information in the current area (such as the changes of new born population, death population, marriage situation, or the like).

The civil service platform 152 may refer to a platform for initial processing of civil data. The civil service platform 152 may respectively communicate with the user platform 151 and the civil administration platform 153 to obtain relevant data and process the data. For example, the civil service platform 152 may receive information from the civil administration platform 153, and perform extraction, classification, reprocessing and other processing operations on the data received, to generate valuable information such as statistical data, trend data, and comparison data, and provide the users with the corresponding service according to their needs. Exemplarily, when the government staff requests the local resident tax situation, the civil service platform 152 may classify and summarize the taxation of each resident, and obtain the population of each tax gradient and the corresponding tax amount. For another example, the civil service platform 152 may further obtain civil service requests through the sensing network platform 210, process the civil service requests and transmit to the civil administration platform 153. Exemplarily, when the resident changes the resident information through the user platform 151 (such as newborns), the civil service platform 152 may update the resident information in the database and send the updated information to the civil administration platform 153 based on the user's changes. In some embodiments, the civil service platform 152 may include a plurality of sub-platforms and corresponding sub-databases. For example, the civil service platform 152 may include sub-platforms 1, 2 . . . n. A corresponding database may be set under each sub-platform, such as databases 1, 2 . . . n. In some embodiments, the sub-platforms of the civil service platform 152 may realize part of the functions of the civil service platform 152. For example, the civil service platform 152 may include a tax service sub-platform for summarizing resident tax data, and store the tax data in a sub-database.

The civil administration platform 153 may refer to a platform for integrated management of the civil administration system 200 in a smart city, which is the core function platform for the government to manage the IoT system. The civil administration platform 153 may coordinate and manage all information of the civil administration system 200 in a smart city. For example, the civil administration platform 153 may obtain target resident information in a target area from the civil service platform, and determine the increased population of the target area within a target period based on the target resident information. The civil administration platform 153 may include the processing devices in FIG. 1 and other components. In some embodiments, the civil administration platform 153 may be a remote platform manipulated by a manager, an artificial intelligence, or preset rules. In some embodiments, the civil administration platform 153 may include a plurality of sub-platforms and corresponding sub-databases. For example, the civil administration platform 153 may include sub-platforms 1', 2' . . . n'. A corresponding database may be set under each sub-platform, such as databases 1', 2' . . . n'. In some embodiments, the sub-platforms of the civil administration platform 153 may realize part of the functions of the civil administration platform 153. For example, the civil administration platform 153 may include an increased population prediction sub-platform for predicting the increased population of the current area within a preset period.

The sensing network platform 210 may refer to a functional platform for managing the communications of civil services. In some embodiments, the sensing network platform 210 may connect the civil administration platform 153 and the object platform 220 to implement communication functions. In some embodiments, the sensing network platform may include a plurality of sensing network sub-platforms.

The object platform 220 may refer to the execution platform of civil service instructions and the obtaining platform of the related civil data. For example, the object platform 220 may obtain a civil service instruction generated by the civil administration platform 153 in response to the user's civil service request through the sensing network 210, and execute the civil service instruction to meet the user's civil service request. Exemplarily, when the user requests to register newborn information, the civil administration platform may respond to the user's request, register, and generate newborn's resident information (such as the resident ID number, the birth certificate, etc.). The object platform 220 may show the newborn's resident information to user to complete registration. For another example, the object platform 220 may obtain relevant civil service information through a sensor. Exemplarily, when the user inputs a civil service request, the user's relevant verification data (such as resident ID card information, user portraits, etc.) may be obtained through the object platform 220, and the relevant verification data may be sent to the civil administration platform 153 through the sensing network platform, so that the civil administration platform 153 may perform verification on the user rights based on the relevant verification data.

For those skilled in the art, after understanding the principle of the system, the system may be used in any other suitable scene without departing from the principle.

The following will specifically illustrate the civil administration system 200 in a smart city by taking the example of applying it to the increased population prediction as an example.

The civil administration platform 153 may be configured to obtain the target resident information of the target area from the civil service platform 152; and determine the increased population of the target area within the target period based on target resident information. The target resident information may be obtained after processing the corresponding resident information of the target user by the civil service platform 152 in response to the civil service request sent by the target user through the user platform 151. More about the determining the increased population may be referred to in FIG. 3 and related descriptions, which will not be repeated here.

In some embodiments, the civil administration platform 153 may further be configured to process the target resident information based on a population prediction model to determine the increased population. More about the population prediction model may be referred to in FIG. 3, FIG. 4, and related descriptions, which will not be repeated here.

In some embodiments, the civil administration platform 153 may further be configured to obtain social development features of the target area. The increased population features of the target area within the target period may be determined by processing the social development features based on a feature prediction model. The increased population may be determined by processing the target resident information and the increased population features based on the population prediction model. More about the feature prediction model may be referred to in FIG. 4, FIG. 5 and related descriptions, which will not be repeated here.

In some embodiments, the civil administration platform 153 may further be configured to obtain a plurality of candidate solutions used for encouraging fertility when the increased population is smaller than a preset population threshold. The civil administration platform 153 may score the plurality of candidate solutions; and determine a target solution of the target area within the target period based on the scores of the candidate solutions. More about scoring the candidate solutions may be referred to FIG. 6 and related descriptions, which will not be repeated here.

In some embodiments, for each of the candidate solutions, the civil administration platform 153 may be further configured to determine a score of the candidate solution by processing the candidate solution and the target resident information based on a scoring model. More about the scoring model may be referred to in FIG. 6 and related descriptions, which will not be repeated here.

It should be noted that the above for the system and its components are intended to be convenient, and this specification is not limited to the scope of the description. It will be appreciated that for those skilled in the art, after understanding the principle of the system, it may be combined without departing from this principle, or constituting the subsystem is connected to other components. For example, the sensing network platform and the public places management platform may be integrated into an integral part. Alternatively, for example, each component may share a storage device, and each component may further have respective storage devices. Since this type of deformation is within the scope of the specification.

FIG. 3 is an exemplary flowchart illustrating the method for civil administration in a smart city based on the IoT according to some embodiments of the present disclosure. In some embodiments, flow 300 may be performed by a civil administration platform 153. As shown in FIG. 3, the flow 300 may include the following operations:

In 310, obtaining target resident information in a target area from the civil service platform; the target resident information may be obtained after processing resident information of the target user by a civil service platform in response to a civil service request sent by a target user through a user platform.

In some embodiments, the civil administration platform 153 may call the target resident information of the target area from the civil service platform 152. More about the civil service platform 152 and the user platform 151 may be referred to FIG. 2 and related descriptions.

The civil service request may refer to the service request on civil and social affairs proposed by the user through the user platform. For example, the civil service request may include residents' service requests on administrative affairs related to the people, such as marriage registration, housing registration, change of household registration, or the like. In some embodiments, the user may record the specific request content in the civil service request when sending a civil service request to the user platform 151. After the user platform 151 sends the civil service request to the civil service platform 152, the civil service platform 152 may analyze the civil service request to obtain the user's specific request content. For example, the user's specific request content may include the resident information and a request for updating the resident information (such as a marriage registration). The civil service platform 152 may update the resident information of the corresponding resident based on the analyzing result of the civil service request.

In some embodiments, the civil service request may further include the requests of predicting the increased population of the target area within a target period by staffs. After receiving the civil service request, the civil service platform 152 may transfer the request to the civil administration platform 153, which may perform the relevant instructions of the civil administration method provided by the present disclosure. When the civil administration platform 153 performs the relevant instructions of the civil administration method provided by the present disclosure, the civil service platform 152 may determine the target resident information by processing the resident information in response to the relevant instructions of the civil administration platform 153.

Resident information may further be referred to as citizen personal information, which may refer to various information recorded by electronic or other means that can recognize the identity of a specific natural person or reflect the activities of a specific natural person alone or in combination with other information. For example, the resident information may include name, ID number, communication and contact information, address, username and password, property status, whereabouts, or the like.

In some embodiments, the resident information may be loaded in a civil service request. When the user platform 151 receives the civil service request, the civil service platform 152 may analyze the civil service request to determine the corresponding resident information. For example, residents may send newborn registration requests through the user platform 151 (such as the newborn sub-platform), and the relevant information of the newborn may be included in the request, wherein the information may include family information, gender, date of birth, or the like. After obtaining the newborn registration requests, the civil service platform 152 may analyze the newborn registration requests to record the information of the newborn into a resident information database, and update the resident information of the relevant personnel (such as the parents of newborns).

In some embodiments, the resident information may be classified into household situation information, inhabiting situation information, and financial situation information, or the like, depending on the source and the function of the information. In some embodiments, resident information may further include other relevant information such as education, communication and contact information, and whereabouts.

The household situation information may refer to basic information of residents in legal documents related to the household registration. For example, the household situation information may include information like name, age, ID number, marriage status, family composition, household status, etc. In some embodiments, the household situation information may be determined by calling the electronic archives of the residents. For example, the electronic archives of residents may be stored in the database of the sub-platform of the civil service platform 152 (e.g., the resident database of the public security sub-platform). When the civil administration platform 153 requires the information, database of the sub-platform of the civil service platform 152 may call and process the household situation information.

The inhabiting situation information may refer to information related to the inhabiting of the residents. For example, the inhabiting situation information may include ownership of the currently inhabited house (e.g., whether it's bought or rented), rental period, family residence status, etc. In some embodiments, the inhabiting situation information may be determined by the relevant survey information of the residents. For example, residents' inhabiting situation information may be obtained from the inhabiting situation description filled by the residents in the communities or the working units.

The financial situation information may refer to information related to the properties and incomes of the residents. For example, the property information may include tax information, income information, social subsidies information, etc. of the residents. In some embodiments, the financial situation information of the residents may be stored in the database (e.g., the database of tax-paying sub-platform, the database of subsidy sub-platform, etc.). When the civil administration platform 153 requires the information, the database of the sub-platform of the civil service platform 152 may call and process the household situation information.

The target area may be an area where the civil administration platform 153 performs an increased population prediction. The target period may be a period when the increased population may be predicted by the civil administration platform 153. In some embodiments, the target area and the target period may be determined according to the increased population prediction task. For example, the increased population prediction task set by the user includes predicting the increased population in A city in the next three years, then the corresponding target area may be A city, the target period may be three years later from the current time.

In some embodiments, the target area may be determined by determining the boundary of the target area. For example, the boundary of the target area may be determined according to the administrative divisions, wherein the administrative divisions may be areas classified by the government according to relevant policies or systems and for the convenience of public administration. Exemplarily, the target area may include Louisiana and its jurisdiction. In some embodiments, a partial area may be selected as the target area from the areas of the administrative division. For example, a part of the jurisdiction of Louisiana may be selected as a target area, exemplarily, Arcadia Parish may be selected as the target area.

In some embodiments, the target period may be a preset period. For example, the target period may refer to the period from the current time to one year later. In some embodiments, the target period may include a plurality of time periods. For example, the target period may include 0-1 years, 1-2 years, 2-3 years etc. from the current time, and the civil administration platform 153 may obtain the increased populations corresponding to each time period.

The target residents may be residents related to the target area whose resident information is recorded in the civil service platform 152. For example, the target residents may be all residents of the target area in the database. In some embodiments, the target residents may be determined according to the collected information and/or the information needed in the process of increased population prediction. For example, the target residents may further include residents of the areas similar to the target area. Exemplarily, target residents may include all residents of the target area and residents in areas with similar economic situations compared with the target area.

The target resident information may refer to information, used for the increased population prediction, of the resident information of residents. In some embodiments, the target resident information may be determined according to the resident information of all target residents of the target area. In some embodiments, the civil service platform 152 may perform data processing on the resident information of the target area to obtain the target resident information, wherein the data processing may include statistical processing such as integration, screening, classification, etc. For example, the civil service platform 152 may integrate the relevant information of corresponding residents in various sub-platforms with the resident ID number as the primary key to obtain the known resident information of each resident as the target resident information. For another example, the civil service platform 152 may take specific resident information as the standard of classification (e.g., the tax amount of the residents may be taken as a classification standard), to classify the resident information and obtain statistical results on different categories of resident information.

In 320, determining the increased population of the target area within the target period based on the target resident information.

The increased population may refer to the populations increased compared with the current population of the target area within the target period. For example, the increased population may include the new born population, immigrant population, etc. within the target period. In some embodiments, the increased populations may further be described by the relevant indicators of the increased population. For example, the increased population may be described by the indicators like net population inflow rate, birth rate, etc.

In some embodiments, the law of the increase of population may be determined according to the target resident information, and further, the increased population in the target period compared to the current population may be determined. For example, statistics may be performed to the target resident information to determine the average marriage age, the average reproductive age and other relevant information. Then, the new born population may be predicted and taken as the increased population based on the data of populations that reach the average marriage age and the average reproductive age.

In some embodiments, the law of the increase of population may be characterized by a machine learning model (such as a population prediction model), which means the law of the increase of population may be embodied by the parameters of the population prediction model. The increased population may be determined by processing the target resident information based on the population prediction model, wherein the target resident information may be the input of the population prediction model, and the increased population may be the output of the population prediction model.

In some embodiments, the population prediction model may be stored in a sub-database of the civil administration platform 153. When the platform performs the increased population prediction, it may call the population prediction model from the sub-database.

In some embodiments, the target resident information of the target area may be input to the population prediction model in family groups. In some embodiments, a feature vector may be determined according to the statistics of the target resident information, the feature vector may be taken as the input of the population prediction model, and various feature values of the feature vector may describe the features of the resident information. For example, the feature vector of the target resident information may be represented as (a, b, c, d, e, f, g), wherein a may represent the total population of the target area, b may represent the population with high fertility of the target area, c may represent the married population, d may represent the number of children of the married population, e g may represent the portion of residents with different income levels.

In some embodiments, the increased population may include new born population of different types of residents. For example, the new born population of urban household families, the new born population of rural household families, the new born population of families with tax payment of more/less than 1,000 yuan, or the like.

In some embodiments, the population prediction model may include, but are not limited to, Deep Neural Networks (DNN), Recurrent Neural Network (RNN), Long Short-Term Memory (LSTM), or the like.

The population prediction model may be trained based on historical target resident information. Training samples may be historical target resident information within a plurality of sample periods, and the label of training samples may be the historically increased population corresponding to each sample period, wherein the historically increased population may refer to the increased population of the area corresponding to the historical target resident information within a target period in the training sample. In some embodiments, the historically increased population and the historical target resident information may be stored in the sub-database of civil service platform 152.

When training the population prediction model, labeled training samples may be input to an initial population prediction model, and parameters of the initial population prediction model may be updated through training. When the trained model meets the preset conditions, the training ends, and the trained population prediction model may be obtained.

In some embodiments, the input of population prediction model may further include population increase features. The population increase features may reflect the influence of social development of the target area on the increased population. More about the above embodiments may be referred to FIG. 4 and related descriptions.

It should be noted that the description of the relevant flow 300 is merely for example and description, without limiting the scope of this specification. The flow 300 may be made various modifications and changes may be made under the guidance of the present disclosure. However, these corrections and changes are still within the scope of this specification. For example, updating resident information by the civil service platform 152 and increased population prediction by the civil administration platform 153 may be two independent processes. For another example, the civil administration platform 153 may, when the resident information updates, automatically perform increased population prediction to update the increased population of the target area within the target period.

Figure 4:
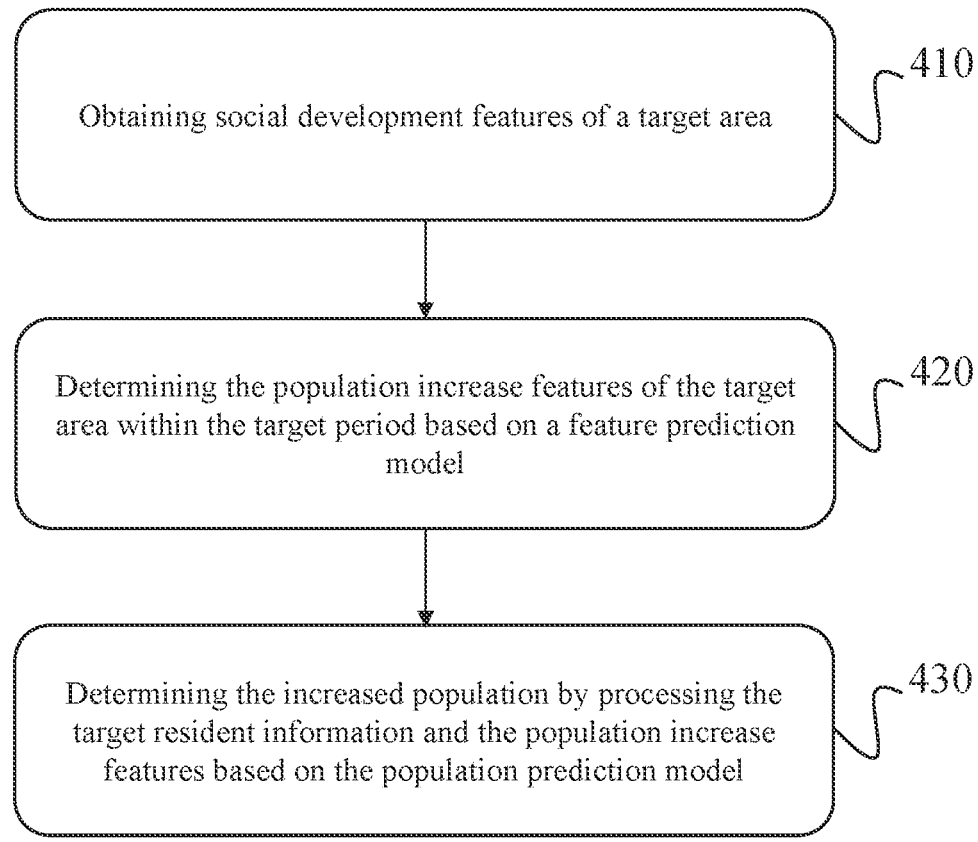
FIG. 4 is an exemplary flowchart illustrating a method for determining the increased population according to some embodiments of the present disclosure.

FIG. 4 is an exemplary flowchart illustrating a method for determining the increased population according to some embodiments of the present disclosure. In some embodiments, flow 400 may be performed by a civil administration platform 153. As shown in FIG. 4, the flow 400 may include the following operations:

In 410, obtaining social development features of a target area.

The social development features may refer to quantitative descriptions of social development condition of the target area within a preset time, wherein the preset time may be determined according to a target period. For example, if the target period includes one year from this year, then the preset time may be a period of one year ago till this year. In some embodiments, the social development features may include at least one social development indicator of at least one target area. Each social development indicator may reflect part of social development condition of the target area. For example, the social development features may include social development indicators such as GDP per capita, education level, average age, taxation per capita, inhabiting situation, population flow, or the like.

In some embodiments, the social development features may be represented by a feature vector. Social development indicators may correspond to at least one element of the feature vector, and an element value may be an indicator value corresponding to a social development indicator. For example, the social development features may be represented as the vector (a', b', c', d', e', f'), wherein a' may reflect GDP per capita; b' may reflect the education level, exemplary, b' may include the average educational years of the population of the target area; c' may reflect the average age; d' may reflect taxation per capita; e' may reflect the inhabiting situation, exemplarily, e' may include the proportion of residents living in different types of houses of the target area; f' may reflect the population flow, exemplary, f' may include at least one of population outflow rate, inflow rate, net inflow ratio, and net inflow number of the target area.

In some embodiments, the social development features may be called from other platforms. For example, the social development features may be recorded in related documents of other platforms (such as economic statistical yearbook). Exemplarily, when obtaining the social development features, the corresponding local economic statistical yearbook may be called to determine the social development features.

In some embodiments, resident information may be counted to determine the social development features. For example, when determining the education level, statistics may be made based on the educational level in the resident information, and the average educational years of all residents may be calculated and taken as the educational level.

In some embodiments, resident information in a plurality of periods may further be counted to determine the social development features. For example, the changing trends of education level may be determined through average education ages of the recent three years of the residents.

In 420, determining the population increase features of the target area within the target period based on a feature prediction model.

The population increase features may reflect the influence of the social development features on population increases within the target period. In some embodiments, the population increase features may correspond to the social development features, and be used to quantitatively describe the influence of social development on population increase. For example, in year 2035, the education level of a certain area is 10.5 years; in year 2036, the education level is 11.5 years. Meanwhile, in 2036, the birth rate dropped by 0.5% compared with that in 2035, then the population increase features of education level may be described as that one year's increase of education may lead to a 0.5% drop of birth rate.

In some embodiments, each population increase features may be expressed as the feature vector, wherein the element of the feature vector may correspond to at least one social development indicator, which may reflect the role of the corresponding social development indicator on population increase. In some embodiments, the population increase features may further reflect a comprehensive role of at least two social development indicators on population increase. In some embodiments, the population increase features may describe the increased population of each resident type. For example, the resident type may include urban households and rural households, then the population increase features may include new born population of urban household families and new born population of rural household families.

In some embodiments, the social development features may be used as input of the feature prediction model, and population increase features within the target period may be taken as output of the feature prediction model.

In some embodiments, the feature prediction model may be stored in the sub-database of the civil administration platform 153. When the civil administration platform 153 performs increased population predictions, it may call the feature prediction model from the sub-database.

In some embodiments, the feature prediction model may include any one or combinations of DNN, RNN, LSTM, etc., or other machine learning models that enables similar functions.

When the feature prediction model is LSTM, the feature prediction model may input the social development features of a plurality of continuous times, thereby determining the impact of social development features on the increased population based on the changes of social develop features over time, so that the population increase features of the target area within each period may be correlated, thereby improving the accuracy of the population increase features.

In some embodiments, the feature prediction model may further be other models. For example, support vector machine (SVM), logistic regression model, naive Bayes classification model, Gaussian distribution Bayesian classification model, decision tree model, random forest model, KNN classification model and neural network model, or the like.

In some embodiments, the feature prediction model may be trained based on historical data. For example, training data of the feature prediction model may be determined based on historical data, wherein the training data may include training samples and sample labels. When performing training on the feature prediction model, the training may be performed to an initial training model of the feature prediction model based on the training data. The loss function may be constructed according to the output of the initial training model and the sample labels, and the parameters of the initial training model may be iteratively updated based on the loss function, until the output of the initial training model satisfies the output conditions, and the trained initial training model is used as the feature prediction model.

In some embodiments, the training sample of the feature prediction model may include historical social development features, and the sample label may be historical population increase features corresponding to the historical social development features. In some embodiments, the historical population increase features may be labeled manually. In some embodiments, the historical population increase features may further be determined based on the population increase at adjacent time periods. For example, population increase variations may be determined based on population increase data at two continuous periods and taken as the historical population increase features.

In some cases, it may be difficult to capture the relationship between the social development features and the population increase features by training the feature prediction model alone. Some embodiments of the present disclosure may perform training on a similarity determination model which contains the population prediction model. When the similarity determination model training is completed, the parameters of the population prediction model in the similarity determination model may be obtained. Thus, the feature prediction model may be determined. More descriptions about the above embodiments may be referred to FIG. 5 and related descriptions, which will not be repeated here.

In 430, determining the increased population by processing the target resident information and the population increase features based on the population prediction model.

In some embodiments, the input of the population prediction model may include the target resident information and the population increase features, and the output may include the increased population of the target area within the target period. Correspondingly, when the population prediction model includes the population increase features, the training samples may include the historical population increase features during the training of population prediction models, wherein the historical population increase features may be determined after processing the historical social development features through the feature prediction model. More contents about the population prediction model may be referred to in operation 320 and related descriptions, which will not be repeated here.

In some embodiments, the input of the population prediction model may further include current schemes and policies to encourage fertility of the target area. That is, when determining the increased population, the population prediction model may consider the impact of current schemes and policies to encourage fertility on the residents' willingness to give birth. More descriptions about schemes and policies to encourage fertility may be referred to in FIG. 6 and related descriptions.

Figure 5:
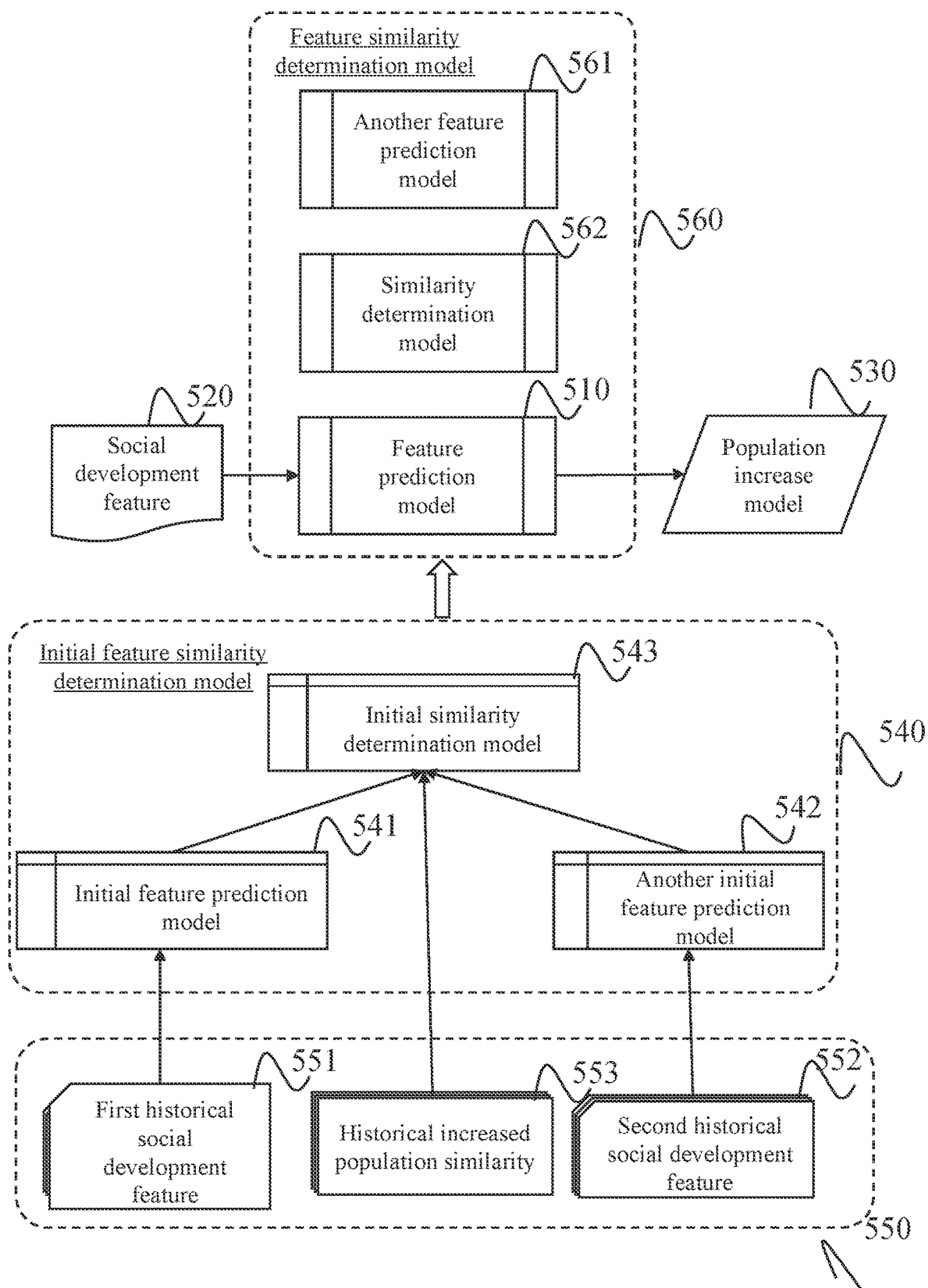
FIG. 5 is a schematic diagram illustrating a process for training of a prediction model according to some embodiments of the present disclosure.

FIG. 5 is a schematic diagram illustrating a process for training of a prediction model according to some embodiments of the present disclosure.

In some embodiments, parameters of a feature prediction model 510 may be obtained by training a feature similarity determination model 560. The feature similarity determination model 560 may include the feature prediction model 510, another feature prediction model 561, and a similarity determination model 562. The feature prediction model 510, another feature prediction model 561, and the similarity determination model 562 may be the layers in the feature similarity determination model 560, and the feature prediction model 510 and another feature prediction model 561 may be the same layer. In some embodiments, the feature prediction model 510 and another feature prediction model 561 may be RNN, and the similarity determination model 562 may be DNN.

Another feature prediction model 561 may be a model for predicting a population increase features of another target area. For example, the feature prediction model 510 may be a model that predicts the population increase features of A City, and another feature prediction model 561 may be a model for predicting the population increase features of B City. The another target area may refer to an area similar to the target area. For example, another target area may be similar with the target area in population composition, economic development, etc., which may be an area of reference for the assessment of the increased population.

The input of the feature similarity determination model 560 may include the social development feature 520 of the target area corresponding to the feature prediction model 510 and the social development feature of another target area corresponding to another feature prediction model 561, and its output may be the similarity of population increase features between the target area corresponding to the feature prediction model 510 and another target area corresponding to another feature prediction model 561. Specifically, the social development feature 520 of the target area corresponding to the feature prediction model 510 may be input to the feature prediction model 510, which may output the population increase feature 530 corresponding to the target area; and the social development feature of another target area corresponding to another feature prediction model 561 may be input to another feature prediction model 561, which mat output the population increase feature corresponding to another target area. The output of the feature prediction model 510 and the output of another feature prediction model 561 may be input to the similarity determination model 562, thereby obtaining the similarity between the population increase features of the two areas. The similarity between the population increase features of the two areas may be determined by the vector distance of the population increase features.

In some embodiments, the feature similarity determination model 560 may be obtained by training the initial feature similarity determination model 540. Correspondingly, the initial feature similarity determination model 540 may include an initial feature prediction model 541, an another initial feature prediction model 542, and an initial similarity determination model 543. The initial feature prediction model 541 may be a feature prediction model 510 without setting model parameters.

The feature prediction model 510 and another feature prediction model 561 have similar training objects, similar training methods, and similar training contents. Therefore, in some embodiments of the present disclosure, when training the feature similarity determination model 560, the another initial feature prediction model 542 may share the parameter of the initial feature prediction model 541.

In some embodiments, the initial feature similarity determination model 540 may be trained based on training data 550. The training samples may include a first historic social development feature 551 and a second historic social development feature 552, the label may be a historical increased population similarity of the two areas 553. The training samples may be determined based on historical data. The historical data may be the relevant data if the target area and another target area at a variety of historical time points. For example, the historical data may include the social development features stored in the database of a civil service platform 152 of the target area and the another target area. The labels may be obtained by manually processing the historical social development features of the two areas.

In some embodiments, the first historical social development feature 551 may be input to the initial feature prediction model 541, and the second historical social development feature 552 may be input to the another initial feature prediction model 542. The output of the initial feature prediction model 541 and the output of the another initial feature prediction model 542 may be input to the initial similarity determination model 543. A loss function may be constructed based on the output of the initial similarity determination model 543 and the labels. The parameters of the initial feature prediction model 541, the another initial feature prediction model 542, and the initial similarity determination model 543 may be iteratively updated at the same time based on the loss function, until meeting the preset conditions, and the training may be completed. After that, the trained feature similarity determination model 560 may be obtained, and the parameters of the feature prediction model 510 of the feature similarity determination model 560 may further be determined.

Obtaining the parameters of the feature prediction model 510 through the above training method may be beneficial in some cases to solve the problem of difficulty in obtaining labels when training the feature prediction model 510 alone. Through comparing the similarities of the population increase features of the two areas by the feature similarity determination model 560, the feature prediction model 510 may be determined, and the relationship between the social development features and population increase features of the target area may be better reflected, which makes the predictions more accurate.

FIG. 6 is an exemplary flowchart illustrating a process for determination of a target solution according to some embodiments of the present disclosure. In some embodiments, the flow 600 may be performed by a civil administration platform 153. As shown in FIG. 6, the flow 600 includes the following operations:

Step 610, obtaining a variety of candidate solutions used for encouraging fertility when increased population is smaller than a preset population threshold.

The preset population threshold may include one or more of a new born population threshold, a birth rate threshold, a population mobility threshold. For example, when the birth rate is smaller than the preset birth rate threshold in the increased population, it may be considered that the current residents' willingness to give birth is not strong, and policies need to be made to encourage fertility.

The candidate solutions may be policy measures for improving willingness to give birth and reducing fertility risk. For example, the candidate methods may include fertility encouraging policies, fertility tax reduction policies, and fertility environment construction policies. Exemplarily, the fertility environment construction policies may include building a public nursery or children's game location; strengthening normal education vocational training, moral education training and employment support. The fertility tax reduction policies may include fertility rewards, monthly parental subsidies, tax rebates (governmental tax-free), etc. In some embodiments, the candidate solutions may further include talent introduction policy to increase population base and other relevant polities.

The candidate solutions may be obtained according to relevant regulations. For example, the candidate solutions may be exemplary policy measures issued by the superior government. In some embodiments, the candidate solutions may further be proposed by the relevant staff or residents and comply with local and national regulations. The corresponding candidate solutions may be generated by collecting the relevant proposals from the society and selecting compliant proposals or conducting compliance processing on the proposals.

In 620, scoring a variety of candidate solutions.

The score of the candidate solutions may be quantitative evaluations of the effects of the candidate solution in encouraging fertility. For example, after performing an appropriate candidate solution, the residents' willingness to give birth is improved, and there is a significant increase in birth rate, then the candidate solution may have a high score. In some embodiments, the score of the candidate solution may further reflect the advantages and disadvantages, adaptability, etc. of the candidate solution performed in the target area. For example, a higher score may indicate that the candidate solution has higher adaptability in the target area, and the candidate solution may meet the policy needs of the target area.

In some embodiments, the candidate solutions may be scored based on score rules. In some embodiments, the score rules may include a plurality of score factors. When scoring, the score of influence of the candidate solutions on different layers may be determined based on a variety of scoring factors. For example, the scoring factors may include one or more of a population increase factor, a will factor of the masses, implementation costs, perform difficulties. The population increase factor may be the score on population increase after implementing the candidate solution. Exemplarily, if the proportion of the increased population is negative (the increased population is negative), then the score may be 0 point, and based on a preset threshold (e.g., 5%), add 1 point for each 5% increase, up to 10 points. That is, when the increased population rate is 10%, the population increase factor of the candidate solution may be scored as 2 points. The wills of the masses may be the level of acceptance of residents on the candidate solutions. In some embodiments, the will factor of the masses may be determined based on preset rules. For example, when a candidate solution involves fertility rewards, 1000 yuan may be taken as a basis, and 1 point may be added for an increase of 500 yuan. That is, 1500 yuan may be 1 point, 2000 yuan may be 2 points, 2500 yuan may be 3 points, 3000 yuan may be 4 points . . . , and 6000 yuan may be 10 points. The implementation cost may be the cost of implementing the candidate solution in the target area. The higher the implementation cost is, the lower the score of the corresponding candidate solution may be.

In some embodiments, the score rules may further include a weight coefficient of each score factor. When scoring, the final score of the candidate solution may be determined by performing weighted summation on each influence scores based on the weight coefficient. Exemplarily, the set weight coefficient of the increased population rate is 0.6, if a population increase rate is 10% and scores 2 points, then the population increase factor of the candidate solution may score 0.6*2=1.2 points; the set weight coefficient of the will factor of the masses is 0.4, if a fertility reward is 6000 yuan and scores 10 points, then the will factor of the masses of the candidate solution may score 0.4*10=4 points. The general score of the candidate solution may be 5.2 points.

In some embodiments, the scoring rule may be determined based on questionnaires for the residents. For example, questionnaires may be generated according to different candidate solutions, and sent to various residents to obtain the results of the survey, and determine the scoring rules according to the results. In some embodiments, the scoring rules may be determined according to historical data. For example, relevant data of performing a certain candidate solution may be obtained from the historical data, and the influence of the candidate data on the population increase may be determined according to the relevant data to determine the scoring rules.

In some embodiments, for each of the candidate solutions, the target resident information and the candidate solution may be processed based on a scoring model to determine the score of the candidate solution.

In some embodiments, the scoring model may predict the influence of candidate solutions on the increased population of the target area according to the different candidate solutions and the target resident information, and determine the scores of the variety of candidate solutions. The input of the scoring model may be the content of a certain candidate solution and the target resident information, and the output may be the score of the candidate solution.

In some embodiments, the scoring model may be DNN. The candidate solutions and the target resident information may be input to the scoring model through the input layer of the scoring model. The scores of the candidate solutions may be output on the output layer after the processing of each hidden layer of the scoring model.

The scoring model may be trained based on the historical data of the increased population after the implementation of each candidate solution. The training samples may include candidate solutions performed at different time points in the history and the target resident information at that time, and the labels of training samples may be determined based on the increased population within the target time period after performing the candidate solution. For example, the labels of training samples may be scoring labels. The greater the increased population proportion after performing the candidate solution is, the higher the score of the scoring label may be. In some embodiments, the score of the scoring label may be determined based on the proportion of the increased population in the total population. For example, if the proportion of the increased population is negative, then the scoring label may be 0 point. For other situations, comparisons may be performed based on the value of the proportion of the increased population and a proportion threshold (e.g., the threshold may be 5%). 1 point may be added to the scoring label whenever the value of the proportion of the increased population meets the proportion threshold. That is, if the proportion is 5%, the scoring label may be 1 point; if the proportion is 10%, the scoring label may be 2 points . . . if the proportion is 50%, the scoring label may be 10 points. The scoring label may be up to 10 points.

The parameters of an initial scoring model may be updated by training through input the labeled training samples to the initial training model. When the trained model meets preset conditions, the training ends and a trained scoring model may be obtained.

In some embodiments, the input of the scoring model may further include population increase features. Correspondingly, when training the scoring model, the training sample may further include historical population increase features within each historical target period.

In 630, determining the target solution of the target area within target period based on the scores of a variety of candidate solutions.

In some embodiments, based on the scores of a variety of candidate solutions, the target solution of the target area within the target period may be determined. For example, the candidate solution with the highest score may be taken as the target solution.

In some embodiments, the present disclosure may further provide a computer readable storage medium, the storage medium storages computer instructions, when the computer reads the computer instructions in the storage medium, the computer performs the method for civil administration in a smart city based on the IoT.

The method, system, device, and computer readable storage device for civil administration in a smart city based on the IoT provided by the embodiments of the present disclosure may at least have the following beneficial effects: (1) The present disclosure may update resident information in real time, determine target resident information from the resident information, and perform increased population prediction based on the target resident information, so that the prediction accuracy and the timeliness of the civil administration method may be improved. (2) The present disclosure introduces social development features and population increase features during the increased population prediction process, thereby further improving the accuracy of the increased population prediction. (3) By scoring the candidate solutions, the present disclosure may more accurately predict the influence of different candidate solutions on the increased population to determine the optimal candidate solution as a target solution, thereby providing help for the development and implementation of the policy.

It should be noted that the beneficial effects that may be generated in different embodiments may be different, and the beneficial effects that may be generated in different embodiments may be any one or more of the above, or any other possible beneficial effects to be obtained.

The basic concepts have been described above, apparently, for those skilled in the art, the above detailed disclosure are only for illustration, which should not limit the scope of the present disclosure. Although there is no clear explanation here, those skilled in the art may make various modifications, improvements, and corrections for this specification. This type of modification, improvement, and corrections are recommended in this specification, so this class is modified, improved, and the amendment remains in the spirit and scope of the exemplary embodiment of the present disclosure.

Meanwhile, this specification uses specific words to describe embodiments of the present disclosure. As "one embodiment", "an embodiment", and/or "some embodiments" means a certain feature, structure, or feature of the present disclosure at least one embodiment. Therefore, it should be emphasized and noted that "an embodiment" or "one embodiment" or "an alternative embodiment" or "an alternative embodiment" or "an alternative embodiment" mentioned in this specification is not necessarily referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not used to define the order of the present disclosure processes and methods. Although some examples of the invention currently considered useful in the above disclosure are discussed, it is understood that such detailed purposes only, the appended claims are not limited to disclosed embodiments, in opposite, the claims are designed to cover all amendments and equivalents in accordance with the substance and range of the present disclosure. For example, although the implementation of various components described above may be embodied in a hardware device, it may further be implemented as a software only solution, e.g., an installation on an existing server or mobile device.

Similarly, it should be noted that in order to simplify the expression disclosed in this specification, it is intended to help the embodiments of one or more inventive embodiments, and a plurality of features may be returned to one embodiment in the description of the present disclosure. However, this disclosure method does not mean that the characteristics required by the object of this description are more than the characteristics mentioned in the claims. Rather, claimed subject matter may lie in less than all features of a single foregoing disclosed embodiment.

In some embodiments, a number of descriptions, attributes, should be understood, such for the numbers described in the embodiments, in some examples, "approximately", "approximation" or "generally" in some examples. Modified. Unless otherwise stated, "approximately", "approximate" or "substantially" indicates that the number is allowed to have a change in ±20%. Accordingly, in some embodiments, the numerical parameters used in the specification and claims are approximate, and the approximation may change according to the features required by the individual embodiments. In some embodiments, numerical parameters should take into account the predetermined effective digits and the general bits reserved. Although some embodiments of the present disclosure are used to confirm the range of ranges, the range of ranges of the wide range is an approximate value, in the specific embodiment, the setting of such values is as accurate as possible within the feasible range.

For each patent, patent application, patent application publications and other materials referenced in this specification, such as articles, books, instructions, publications, documents, etc., here, all of them will be incorporated herein by reference. Except for the application history documentation of the present disclosure or the conflict, there is also an except for documents (current or after the present disclosure), which are available in this specification. It should be explained that if the use of description, definition, and/or terminology in this instruction manual is inconsistent or conflict with the content described in this description, the use of the description, definition and/or terms of this instructions shall prevail as shall prevail.

Finally, it should be understood that the embodiments described in this specification are intended to illustrate the principles of the embodiments of the present disclosure. Other deformations may further belong to the scope of this specification. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

We claim:

1. A method for civil administration in a smart city based on Internet of Things (IoT), which is applied in a processing device of a civil administration platform, comprising:
  obtaining target resident information of a target area from a civil service platform through a network, wherein the target resident information is obtained by the civil service platform after processing resident information of a target user in response to a civil service request sent by the target user through a terminal used by the target user of a user platform through the network; and determining, based on the target resident information, an increased population of the target area within a target period, wherein the determining the increased population of the target area within the target period based on the target resident information comprises:

obtaining social development features of the target area;

determining increased population features of the target area within the target period by processing, based on a feature prediction model, the social development features; wherein the feature prediction model is machine learning model, including Long Short-Term Memory (LSTM), the feature prediction model is obtained by training an initial feature similarity determination model based on first training samples and first labels, the initial feature similarity determination model includes an initial feature prediction model, another initial feature prediction model, and an initial similarity determination model, the first training samples include a first historic social development feature and a second historic social development feature, the first labels include a historical increased population features similarity between a target area corresponding to the feature prediction model and a target area corresponding to the another initial feature prediction model, when the feature prediction model is LSTM, inputting the social development features of the target area at social development features of a plurality of continuous times to the feature prediction model;

determining impact of the social development features of the plurality of continuous times on the increased population based on the changes of the social development features over time;

wherein the feature prediction model is trained based on training data which is determined based on historical data, the training data includes third training samples and third labels, the training of the feature prediction model includes:

inputting the third training samples to an initial feature prediction model and obtaining an output of the initial feature prediction model;

constructing a loss function based on the output of the initial feature prediction model and the third labels; and updating parameters of the initial feature prediction model based on the loss function, until meeting preset conditions;

obtaining the feature prediction model; and the training of the feature similarity determination model includes:

inputting the first historical social development feature to the initial feature prediction model and obtaining the output of the initial feature prediction model;

inputting the second historical social development feature to the another initial feature prediction model and obtaining the output of the another initial feature prediction model;

inputting the output of the initial feature prediction model and the output of the another initial feature prediction model to the initial similarity determination model and obtaining the output of the initial similarity determination model;

constructing a loss function based on the output of the initial similarity determination model and the first labels; and updating parameters of the initial feature prediction model, the another initial feature prediction model, and the initial similarity determination model iteratively at the same time based on the loss function, until meeting preset conditions;

obtaining the feature prediction model, another feature prediction model, and a similarity determination model; and determining the increased population by processing, based on a population prediction model, the target resident information and the increased population features; wherein the population prediction model is machine learning model, the population prediction model is obtained by training based on second training samples and second labels, the second training samples include historical target resident information within a plurality of sample periods and historical increased population features, and the second labels include historical increased population corresponding to each sample period;

the method further comprises:

obtaining a plurality of candidate solutions used for encouraging fertility when the increased population is smaller than a preset population threshold;

for each of the plurality of candidate solutions, determining a score of the candidate solution by processing, based on a scoring model, the candidate solution, the target resident information, and increased population features; wherein the scoring model is machine learning model, the scoring model is obtained by training based on third training samples and third labels, the third training samples include candidate solutions performed at different time points in the history, target resident information at that time, and historical increased population features within each historical target period, and the third labels are determined based on the increased population within a target time period after performing the candidate solutions, the training of the scoring model includes:

inputting the third training samples to an initial scoring model and obtaining an output of the initial scoring model;

constructing a loss function based on the output of the initial scoring model and the third labels;

updating parameters of the initial scoring model, until meeting preset conditions; and obtaining the scoring model; and determining, based on scores of the candidate solutions, a target solution of the target area within the target period.

2. A system for civil administration in a smart city based on Internet of Things (IoT), which comprises a user platform, a civil service platform and a civil administration platform, wherein the civil administration platform that includes a processor that is configured to perform the following operations including:

obtaining target resident information of a target area from a civil service platform through a network, wherein the target resident information is obtained by the civil service platform after processing resident information of a target user in response to a civil service request sent by the target user through a user platform configured to be a terminal used by the target user through the network; and determining, based on the target resident information, an increased population of the target area within a target period, wherein the determining the increased population of the target area within the target period based on the target resident information comprises:

obtaining social development features of the target area;

determining increased population features of the target area within the target period by processing, based on a feature prediction model, the social development features; wherein the feature prediction model is machine learning model, including Long Short-Term Memory (LSTM), the feature prediction model is obtained by training an initial feature similarity determination model based on first training samples and first labels, the initial feature similarity determination model includes an initial feature prediction model, another initial feature prediction model, and an initial similarity determination model, the first training samples include a first historic social development feature and a second historic social development feature, the first labels include a historical increased population features similarity between a target area corresponding to the feature prediction model and a target area corresponding to the another initial feature prediction model, when the feature prediction model is LSTM, inputting the social development features of the target area at of a plurality of continuous times to the feature prediction model;

determining impact of the social development features of the plurality of continuous times on the increased population based on changes of the social development features over time;

wherein the feature prediction model is trained based on training data which is determined based on historical data, the training data includes third training samples and third labels, the training of the feature prediction model includes:

inputting the third training samples to an initial feature prediction model and obtaining an output of the initial feature prediction model;

constructing a loss function based on the output of the initial feature prediction model and the third labels; and updating parameters of the initial feature prediction model based on the loss function, until meeting preset conditions;

obtaining the feature prediction model; and the training of the feature similarity determination model includes:

inputting the first historical social development feature to the initial feature prediction model and obtaining the output of the initial feature prediction model;

inputting the second historical social development feature to the another initial feature prediction model and obtaining the output of the another initial feature prediction model;

inputting the output of the initial feature prediction model and the output of the another initial feature prediction model to the initial similarity determination model and obtaining the output of the initial similarity determination model;

constructing a loss function based on the output of the initial similarity determination model and the first labels; and updating parameters of the initial feature prediction model, the another initial feature prediction model, and the initial similarity determination model iteratively at the same time based on the loss function, until meeting preset conditions;

obtaining the feature prediction model, another feature prediction model, and a similarity determination model; and determining the increased population by processing, based on a population prediction model, the target resident information and the increased population features; wherein the population prediction model is machine learning model, the population prediction model is obtained by training based on second training samples and second labels, the second training samples include historical target resident information within a plurality of sample periods and historical increased population features, and the second labels include historical increased population corresponding to each sample period;

the method further comprises:

obtaining a plurality of candidate solutions used for encouraging fertility when the increased population is smaller than a preset population threshold;

for each of the plurality of candidate solutions, determining a score of the candidate solution by processing, based on a scoring model, the candidate solution, the target resident information, and increased population features; wherein the scoring model is machine learning model, the scoring model is obtained by training based on third training samples and third labels, the third training samples include candidate solutions performed at different time points in the history, target resident information at that time, and historical increased population features within each historical target period, and the third labels are determined based on the increased population within a target time period after performing the candidate solutions, the training of the scoring model includes:

inputting the third training samples to an initial scoring model and obtaining an output of the initial scoring model;

constructing a loss function based on the output of the initial scoring model and the third labels;

updating parameters of the initial scoring model, until meeting preset conditions; and obtaining the scoring model; and determining, based on scores of the candidate solutions, a target solution of the target area within the target period.

3. A system for civil administration in a smart city based on the IoT, comprising a user platform, a civil service platform, and a civil administration platform, wherein:

the user platform, configured to be a terminal used by a user, is configured to obtain a civil service request sent by the user through a network, and send the civil service request to the civil service platform through the network;

the civil service platform, configured to be a terminal used by a manager, is configured to determine target resident information of a target area by processing, according to the received civil service request received through the network, resident information corresponding to a target user, and send the target resident information to the civil administration platform through the network; and the civil administration platform, configured to be a processing device, is configured to determine, based on the target resident information, an increased population of the target area within a target period, wherein the civil administration platform is further configured to:

obtain social development features of the target area;

determine increased population features of the target area within the target period by processing, based on a feature prediction model, the social development features; wherein the feature prediction model is machine learning model, including Long Short-Term Memory (LSTM), the feature prediction model is obtained by training an initial feature similarity determination model based on first training samples and first labels, the initial feature similarity determination model includes an initial feature prediction model, another initial feature prediction model, and an initial similarity determination model, the first training samples include a first historic social development feature and a second historic social development feature, the first labels include a historical increased population features similarity between a target area corresponding to the feature prediction model and a target area corresponding to the another initial feature prediction model, when the feature prediction model is LSTM, inputting the social development features of the target area at a plurality of continuous times to the feature prediction model;

determining impact of the social development features of the plurality of continuous times on the increased population based on changes of the social development features over time;

wherein the feature prediction model is trained based on training data which is determined based on historical data, the training data includes third training samples and third labels, the training of the feature prediction model includes:

inputting the third training samples to an initial feature prediction model and obtaining an output of the initial feature prediction model;

constructing a loss function based on the output of the initial feature prediction model and the third labels; and updating parameters of the initial feature prediction model based on the loss function, until meeting preset conditions;

obtaining the feature prediction model; and the training of the feature similarity determination model includes:

inputting the first historical social development feature to the initial feature prediction model and obtaining the output of the initial feature prediction model;

inputting the second historical social development feature to the another initial feature prediction model and obtaining the output of the another initial feature prediction model;

inputting the output of the initial feature prediction model and the output of the another initial feature prediction model to the initial similarity determination model and obtaining the output of the initial similarity determination model;

constructing a loss function based on the output of the initial similarity determination model and the first labels; and updating parameters of the initial feature prediction model, the another initial feature prediction model, and the initial similarity determination model iteratively at the same time based on the loss function, until meeting preset conditions;

obtaining the feature prediction model, another feature prediction model, and a similarity determination model; and determine the increased population by processing, based on a population prediction model, the target resident information and the increased population features; wherein the population prediction model is machine learning model, the population prediction model is obtained by training based on second training samples and second labels, the second training samples include historical target resident information within a plurality of sample periods and historical increased population features, and the second labels include historical increased population corresponding to each sample period;

the civil administration platform is further configured to:

obtain a plurality of candidate solutions used for encouraging fertility when the increased population is smaller than a preset population threshold;

for each of the plurality of candidate solutions, determine a score of the candidate solution by processing, based on a scoring model, the candidate solution, the target resident information, and increased population features; wherein the scoring model is machine learning model, the scoring model is obtained by training based on third training samples and third labels, the third training samples include candidate solutions performed at different time points in the history, target resident information at that time, and historical increased population features within each historical target period, and the third labels are determined based on the increased population within a target time period after performing the candidate solutions, the training of the scoring model includes:

inputting the third training samples to an initial scoring model and obtaining an output of the initial scoring model;

constructing a loss function based on the output of the initial scoring model and the third labels;

updating parameters of the initial scoring model, until meeting preset conditions; and obtaining the scoring model; and determine, based on scores of the candidate solutions, a target solution of the target area within the target period.

4. A non-transitory computer-readable storage medium storing computer instructions, wherein when reading the computer instructions in the storage medium, a computer implements a method for civil administration in a smart city based on the IoT, comprising:

obtaining target resident information of a target area from a civil service platform through a network, wherein the target resident information is obtained by the civil service platform after processing resident information of a target user in response to a civil service request sent by the target user through a user platform configured to be a terminal used by the target user through the network; and determining, based on the target resident information, an increased population of the target area within a target period, wherein the determining the increased population of the target area within the target period based on the target resident information comprises:

obtaining social development features of the target area;

determining increased population features of the target area within the target period by processing, based on a feature prediction model, the social development features; wherein the feature prediction model is machine learning model, including Long Short-Term Memory (LSTM), the feature prediction model is obtained by training an initial feature similarity determination model based on first training samples and first labels, the initial feature similarity determination model includes an initial feature prediction model, another initial feature prediction model, and an initial similarity determination model, the first training samples include a first historic social development feature and a second historic social development feature, the first labels include a historical increased population features similarity between a target area corresponding to the feature prediction model and a target area corresponding to the another initial feature prediction model, when the feature prediction model is LSTM, inputting the social development features of the target area at a plurality of continuous times to the feature prediction model;

determining impact of the social development features of the plurality of continuous times on the increased population based on changes of the social development features over time;

wherein the feature prediction model is trained based on training data which is determined based on historical data, the training data includes third training samples and third labels, the training of the feature prediction model includes:

inputting the third training samples to an initial feature prediction model and obtaining an output of the initial feature prediction model;

constructing a loss function based on the output of the initial feature prediction model and the third labels; and updating parameters of the initial feature prediction model based on the loss function, until meeting preset conditions;

obtaining the feature prediction model; and the training of the feature similarity determination model includes:

inputting the first historical social development feature to the initial feature prediction model and obtaining the output of the initial feature prediction model;

inputting the second historical social development feature to the another initial feature prediction model and obtaining the output of the another initial feature prediction model;

inputting the output of the initial feature prediction model and the output of the another initial feature prediction model to the initial similarity determination model and obtaining the output of the initial similarity determination model;

constructing a loss function based on the output of the initial similarity determination model and the first labels; and updating parameters of the initial feature prediction model, the another initial feature prediction model, and the initial similarity determination model iteratively at the same time based on the loss function, until meeting preset conditions;

obtaining the feature prediction model, another feature prediction model, and a similarity determination model; and determining the increased population by processing, based on a population prediction model, the target resident information and the increased population features;

wherein the population prediction model is machine learning model, the population prediction model is obtained by training based on second training samples and second labels, the second training samples include historical target resident information within a plurality of sample periods and historical increased population features, and the second labels include historical increased population corresponding to each sample period;

the method further comprises:

obtaining a plurality of candidate solutions used for encouraging fertility when the increased population is smaller than a preset population threshold;

for each of the plurality of candidate solutions, determining a score of the candidate solution by processing, based on a scoring model, the candidate solution, the target resident information, and increased population features; wherein the scoring model is machine learning model, the scoring model is obtained by training based on third training samples and third labels, the third training samples include candidate solutions performed at different time points in the history, target resident information at that time, and historical increased population features within each historical target period, and the third labels are determined based on the increased population within a target time period after performing the candidate solutions, the training of the scoring model includes:

inputting the third training samples to an initial scoring model and obtaining an output of the initial scoring model;

constructing a loss function based on the output of the initial scoring model and the third labels;

updating parameters of the initial scoring model, until meeting preset conditions; and obtaining the scoring model; and determining, based on scores of the candidate solutions, a target solution of the target area within the target period.

* * * * *